(12) United States Patent
Kimura et al.

(10) Patent No.: US 11,915,193 B2
(45) Date of Patent: Feb. 27, 2024

(54) ARTICLE RECOMMENDATION DEVICE, ARTICLE RECOMMENDATION METHOD, AND RECORDING MEDIUM

(71) Applicant: NEC Corporation, Tokyo (JP)

(72) Inventors: Masaaki Kimura, Tokyo (JP); Takahiro Matsui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 227 days.

(21) Appl. No.: 17/422,409

(22) PCT Filed: Feb. 19, 2020

(86) PCT No.: PCT/JP2020/006581
§ 371 (c)(1),
(2) Date: Jul. 12, 2021

(87) PCT Pub. No.: WO2020/189165
PCT Pub. Date: Sep. 24, 2020

(65) Prior Publication Data
US 2022/0122028 A1 Apr. 21, 2022

(30) Foreign Application Priority Data
Mar. 20, 2019 (JP) .................................. 2019-053718

(51) Int. Cl.
*G06Q 30/02* (2023.01)
*G06Q 10/06* (2023.01)
(Continued)

(52) U.S. Cl.
CPC ....... *G06Q 10/087* (2013.01); *G06Q 30/0202* (2013.01); *G06Q 30/0282* (2013.01)

(58) Field of Classification Search
CPC ............. G06Q 10/087; G06Q 30/0202; G06Q 30/0282
See application file for complete search history.

(56) References Cited

U.S. PATENT DOCUMENTS 7,797,204 B2 * 9/2010 Balent ................ G06Q 30/0633
705/28
9,230,277 B2 * 1/2016 Cook .................. G06Q 30/0619
(Continued)

FOREIGN PATENT DOCUMENTS

| JP | 2005-078326 A | 3/2005 |
|---|---|---|
| JP | 2010-003145 A | 1/2010 |

(Continued)

OTHER PUBLICATIONS

International Search Report for PCT Application No. PCT/JP2020/006581, dated Apr. 14, 2020.
(Continued)

*Primary Examiner* — Talia F Crawley

(57) ABSTRACT

An article recommendation device includes: a memory; and at least one processor coupled to the memory. The processor performs operations. The operations include: acquiring a first article based on information related to a predetermined evaluation in a networking service; acquiring at least one of a category that includes the acquired first article and a feature of the first article; acquiring a second article related to at least one of the acquired category and the feature; and displaying the acquired second article as a recommended article.

16 Claims, 9 Drawing Sheets

(51) Int. Cl.
*G06Q 30/06* (2023.01)
*G06K 9/62* (2022.01)
*G06Q 10/087* (2023.01)
*G06Q 30/0202* (2023.01)
*G06Q 30/0282* (2023.01)

(56) References Cited

U.S. PATENT DOCUMENTS

| | | | |
|---|---|---|---|
| 9,760,802 B2* | 9/2017 | Chen | G06Q 30/0251 |
| 10,162,868 B1* | 12/2018 | Zappella | G06F 16/24578 |
| 11,106,751 B1* | 8/2021 | Kadayam | G06Q 30/0222 |
| 11,544,765 B1* | 1/2023 | Dervidis | G06F 3/0484 |
| 2003/0202017 A1 | 10/2003 | Fukuoka et al. | |
| 2011/0131077 A1* | 6/2011 | Tan | G06Q 30/02 |
| | | | 705/347 |
| 2013/0332291 A1* | 12/2013 | Perez | G06Q 30/0623 |
| | | | 705/14.73 |
| 2014/0214590 A1* | 7/2014 | Argue | G06Q 30/0631 |
| | | | 705/26.7 |
| 2015/0100452 A1 | 4/2015 | Cook et al. | |
| 2015/0262117 A1* | 9/2015 | Li | G06Q 30/02 |
| | | | 235/385 |
| 2018/0316635 A1* | 11/2018 | Chiu | G06F 40/30 |
| 2020/0019976 A1 | 1/2020 | Nakano et al. | |

FOREIGN PATENT DOCUMENTS

| | | |
|---|---|---|
| JP | 2014-052720 A1 | 3/2014 |
| JP | 2015-130000 A1 | 7/2015 |
| JP | 2016-538664 A | 12/2016 |
| JP | 2017-091343 A | 5/2017 |
| WO | 2001/084394 A1 | 11/2001 |
| WO | 2016/052149 A1 | 4/2016 |
| WO | 2018/056222 A1 | 3/2018 |

OTHER PUBLICATIONS

Engihsh translation of Written opinion for PCT Application No. PCT/JP2020/006581, dated Apr. 14, 2020,

* cited by examiner

Fig. 2

| OTHER-COMPANY ARTICLE | CATEGORY |
|---|---|
| BREAD X | WHITE BREAD |
| BREAD Y | WHITE BREAD |
| ... | ... |
| BREAD Z | SWEET BUNS |
| BREAD W | SWEET BUNS |
| ... | ... |
| BREAD P | COOKED BUNS |
| BREAD Q | COOKED BUNS |
| ... | ... |

Fig. 3

| CATEGORY | OWN-COMPANY ARTICLE |
|---|---|
| WHITE BREAD | BREAD A |
| WHITE BREAD | BREAD B |
| ... | ... |
| SWEET BUNS | BREAD C |
| SWEET BUNS | BREAD D |
| ... | ... |
| COOKED BUNS | BREAD E |
| COOKED BUNS | BREAD F |
| ... | ... |

ARTICLE RECOMMENDATION DEVICE, ARTICLE RECOMMENDATION METHOD, AND RECORDING MEDIUM

This application is a National Stage Entry of PCT/JP2020/006581 filed on Feb. 19, 2020, which claims priority from Japanese Patent Application 2019-053718 filed on Mar. 20, 2019, the contents of all of which are incorporated herein by reference, in their entirety.

TECHNICAL FIELD

The present disclosure relates to an article recommendation device and the like.

BACKGROUND ART

In the retail industry, a computer system is used for the purpose of flexibly responding to changes in business such as an improvement in business efficiency and development of business in micro markets. The computer system reduces works of employees related to registration and checkout of purchased articles, customer service and support, in-store monitoring, inventory management, facility management, and the like, for example.

As a technology related to articles, for example, Patent literature (PTL) 1 discloses a technology for transmitting, to users, information related to a beverage that has been laid in stock on the basis of a contribution of a user. PTL 1 describes a notification control system that matches store that has laid in stock of the beverage with user on the basis of a contribution from a user, and transmits, to the matched user, a notification regarding the store that has laid in stock of the beverage.

CITATION LIST

Patent Literature

[PTL 1] JP 2017-091343 A

SUMMARY OF INVENTION

Technical Problem

In a case where there is an article with a good reputation in a networking service, a demand for a different article or the like in a category similar to the article may increase. It is therefore useful for a store to recommend an article related to a reputable article.

It is an object of the present disclosure to provide an article recommendation device and the like for recommending an article related to an article with a good reputation in a networking service.

Solution to Problem

One aspect of the present disclosure provides an article recommendation device includes:
 a memory; and
 at least one processor coupled to the memory.
 The processor performs operations. The operations include:
  acquiring a first article based on information related to a predetermined evaluation in a networking service;
  acquiring at least one of a category that includes the acquired first article and a feature of the first article;
  acquiring a second article related to at least one of the acquired category and the feature; and
  displaying the acquired second article as a recommended article.

One aspect of the present disclosure provides an article recommendation method including:
 acquiring a first article based on information related to a predetermined evaluation in a networking service;
 acquiring at least one of a category that includes the acquired first article and a feature of the first article;
 acquiring a second article related to at least one of the acquired category and the feature; and
 displaying the acquired second article as a recommended article.

One aspect of the present disclosure provides a non-transitory computer-readable recording medium that embodies a program. The program causes a computer to perform a method.

The method includes:
 acquiring a first article based on information related to a predetermined evaluation in a networking service;
 acquiring at least one of a category that includes the acquired first article and a feature of the first article;
 acquiring a second article related to at least one of the acquired category and the feature; and
 displaying the acquired second article as a recommended article.

Advantageous Effects of Invention

The present disclosure has an effect of recommending an article related to an article with a good reputation in a networking service.

BRIEF DESCRIPTION OF DRAWINGS

FIG. 2 is a diagram illustrating an example of information stored in a category storage unit.

FIG. 3 is a diagram illustrating an example of information stored in an article storage unit.

EXAMPLE EMBODIMENT

Figure 1:
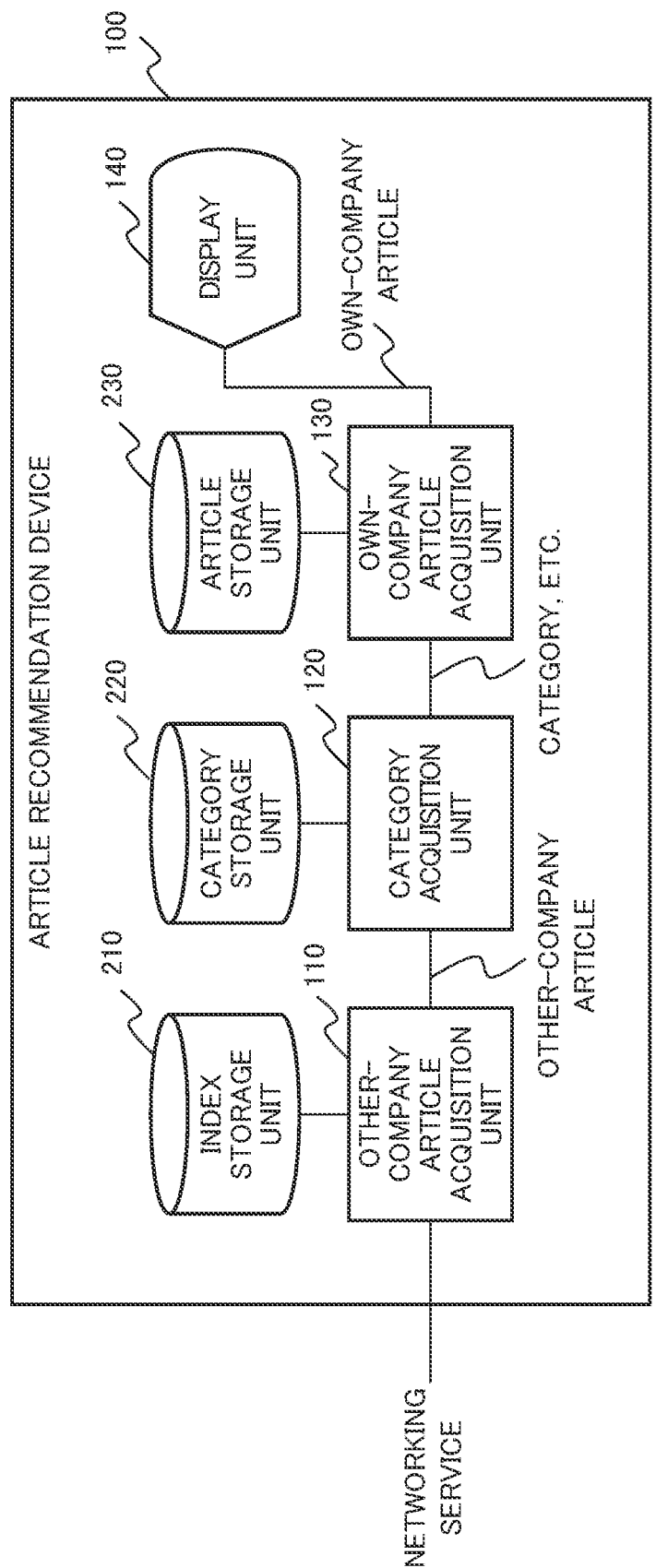
FIG. 1 is a block diagram illustrating a configuration of an article recommendation device according to a first example embodiment.

Example embodiments will be described in detail with reference to the drawings. In the drawings and the example embodiments described in the specification, similar components are designated by the same reference numerals, and the description thereof will be omitted as appropriate.

A company related to articles handled in each example embodiment is not limited. For example, in each example embodiment, an own-company article may be recommended on the basis of a reputation or the like in a networking service related to an other-company article. Alternatively, in each example embodiment, an own-company article may be recommended on the basis of a reputation in a networking service or the like without distinction between an own-company article and an other-company article. Alternatively, in each example embodiment, an own-company article with a good reputation in a networking service in some of own-company stores may be recommended to other stores. However, in the following description of each example embodiment, an own-company article is recommended on the basis of a reputation of an other-company article or the like for simplicity of the description.

The "other-company" is an organization such as a company or a group other than the "own-company", and is not limited in its members and its base for establishment (e.g., laws).

First Example Embodiment

A first example embodiment will be described.

First, a configuration of an article recommendation device 100 according to the first example embodiment will be described.

FIG. 1 is a block diagram illustrating the configuration of the article recommendation device 100 according to the first example embodiment.

Referring to FIG. 1, the article recommendation device 100 includes an other-company article acquisition unit 110, a category acquisition unit 120, an own-company article acquisition unit 130, and a display unit 140.

In the following description, the other-company article acquisition unit 110 acquires an other-company article, and the own-company article acquisition unit 130 acquires an own-company article. However, as described above, in the article recommendation device 100, the company related to the articles is not limited. For example, the other-company article acquisition unit 110 may acquire an own-company article. As described above, in the other-company article acquisition unit 110 and the own-company article acquisition unit 130, the company related to the articles is not limited. Thus, the other-company article may be referred to as a first article, and the own-company article may be referred to as a second article. Furthermore, the other-company article acquisition unit 110 may be referred to as a first article acquisition unit, and the own-company article acquisition unit 130 may be referred to as a second article acquisition unit.

In FIG. 1, the article recommendation device 100 further includes an index storage unit 210, a category storage unit 220, and an article storage unit 230. However, in the article recommendation device 100, a part or all of the index storage unit 210, the category storage unit 220, and the article storage unit 230 may be included in an external device.

The index storage unit 210 stores an index used by the other-company article acquisition unit 110 to acquire other-company articles. For example, in a case where the other-company article acquisition unit 110 uses the number of comments as information related to an evaluation, the index may be a threshold value or a range used for determining the number of comments. In a case where the other-company article acquisition unit 110 uses a plurality of evaluations, the index may be a combination of threshold values, one for each of the evaluations. Here, an evaluation is an evaluation on an article. Information related to an evaluation in the other-company article acquisition unit 110 will be described later in detail.

The category storage unit 220 stores at least one of a category and a feature used by the category acquisition unit 120 in association with an other-company article. One article may be associated with both a category and a feature. Alternatively, one article may be associated with a plurality of categories. Alternatively, one article may be associated with a plurality of features. Alternatively, one article may be associated with a plurality of categories and a plurality of features.

The article storage unit 230 stores an own-company article in association with at least one of a category and a feature. A plurality of own-company articles may be associated with at least one of one category and a feature.

A provider of information stored in the index storage unit 210, the category storage unit 220, and the article storage unit 230 is not limited. For example, a user of the article recommendation device 100 may store, in each storage unit, information created on the basis of knowledge. Alternatively, a user of the article recommendation device 100 may create and store information to be stored in each storage unit by using predetermined machine learning or artificial intelligence (AI).

The form in which the index storage unit 210, the category storage unit 220, and the article storage unit 230 store information is not limited. For example, each storage device may use a database to store information, or may store information in a tabular form.

FIG. 2 is a diagram illustrating an example of information stored in the category storage unit 220. The information illustrated in FIG. 2 is information in which an article name and a category are associated with each other. For example, the second row indicates that bread Y falls into the category of white bread. The table illustrated in FIG. 2 may store information also in association with a feature of the article, or may store information only in association with an article name and a feature of the article.

FIG. 3 is a diagram illustrating an example of information stored in the article storage unit 230. The information illustrated in FIG. 3 is information indicating an own-company article associated with a category. For example, the first row and the second row indicate that articles included in the category of white bread are bread A and bread B. The table illustrated in FIG. 3 may store information also in association with a feature of the article, or may store information only in association with an article name and a feature of the article.

The description returns to the description with reference to FIG. 1.

The other-company article acquisition unit 110 acquires other-company information on the basis of information related to a predetermined evaluation in a networking service. At that time, the other-company article acquisition unit 110 uses a predetermined index in the networking service. More specifically, the other-company article acquisition unit 110 acquires an other-company article by using an evaluation of the other-company article in the networking service and an index stored in the index storage unit 210 for the evaluation.

For example, in a social networking service (SNS), an article that has been mentioned in many descriptions is assumed to have many customers who purchase the article. Thus, the other-company article acquisition unit 110 may use the number of descriptions on the SNS as information related to an evaluation. For example, the other-company article acquisition unit 110 may count the number of descriptions that include an article name in predetermined descriptions (sometimes referred to as "tweets") on the SNS. For example, the other-company article acquisition unit 110 may count an article name included in articles carried by a predetermined store. Alternatively, the other-company article acquisition unit 110 may count descriptions that includes predetermined impression or comment (e.g., a comment that includes a term that can be determined to be favorable) on an article in addition to the article name.

In this case, the index is, for example, a predetermined threshold value. That is, in a case where the number of descriptions related to a certain article on the SNS is larger than the threshold value as an index, the other-company article acquisition unit 110 may acquire the article.

However, the index is not limited to a threshold value or values indicating a range such as limits. For example, the index may be the number of articles to be acquired, such as a predetermined number in descending order of the number of evaluations.

Alternatively, some of the SNSs have a mechanism (e.g., a social button) for inputting an evaluation of content such as a comment. A piece of content for which a large number of such evaluations have been input is highly likely to be referenced, and is also highly likely to lead to purchase of an article included in the content. Thus, the other-company article acquisition unit 110 may use the number of evaluations of a piece of content as information related to an evaluation. In this case, the index is, for example, a threshold value of the number of evaluations of the content.

Alternatively, the other-company article acquisition unit 110 may acquire an other-company article by focusing on a specific term or keyword (e.g., "like", "recommend", "follower", or the like) used in the SNS. For example, the other-company article acquisition unit 110 may count at least one of a specific term and keyword on the SNS as information related to an evaluation.

Alternatively, an evaluation made by a famous person such as an on-screen talent is influential. Thus, the other-company article acquisition unit 110 may count the number of descriptions submitted by predetermined persons (e.g., on-screen talents) who use the networking service as information related to an evaluation.

Furthermore, the other-company article acquisition unit 110 may apply a predetermined weight for information related to evaluations. For example, the evaluation may be expressed by characters instead of numerical values (e.g., "very good", "good", or "not bad"). In this case, the other-company article acquisition unit 110 may set a predetermined weight for each expression and add the numbers of evaluations.

Alternatively, an evaluation made by a specific group such as a research company or a gourmet website is influential. Thus, the other-company article acquisition unit 110 may use the number of descriptions of evaluations by a specific group as information related to an evaluation.

Alternatively, image information appeals more to users of the networking service as compared with character information. Thus, as information related to an evaluation, the other-company article acquisition unit 110 may use, as information related to images, the number of images that include the article or the quantity of the article included in images among images shared on the networking service.

The other-company article acquisition unit 110 may set a range of evaluations to be used. For example, the other-company article acquisition unit 110 may use evaluations in a country. Alternatively, the other-company article acquisition unit 110 may use a period of a predetermined time (e.g., one week) back from the present for the evaluation.

The other-company article acquisition unit 110 may acquire a plurality of other-company articles, instead of acquiring one article. In this case, each component described below may operate for each of the other-company articles, or may operate collectively for at least some of the other-company articles.

The category acquisition unit 120 uses at least one of a category and a feature stored in the category storage unit 220 to acquire at least one of a category that includes an other-company article and a feature of the other-company article acquired by the other-company article acquisition unit 110. The category acquisition unit 120 may acquire at least one of a plurality of categories and a plurality of features.

As an example, a case where the category acquisition unit 120 uses the information in FIG. 2 will be described. For example, it is assumed that the other-company article acquisition unit 110 acquires the bread Y as an other-company article. In this case, the category acquisition unit 120 acquires white bread as a category by using the information in FIG. 2.

The description returns to the description with reference to FIG. 1.

The category is, for example, a classification based on use (food, daily necessities, clothing, furniture, miscellaneous goods, and the like), a classification based on selling space, a classification based on period (year-round articles and seasonal articles), or a classification based on article code.

The feature of the article is not particularly limited as long as the feature can be used for narrowing down the article. For example, the feature of the article includes at least one of a shape, a size, a weight, a color, a tactile sensation, a taste, a raw material, a packaging, and a price of the article. The feature is not limited to a general term related to an article, and may be a "keyword" specifically used in a network service.

The category and the feature are used to acquire an own-company article as described below. It is therefore desirable that the category and the feature be set on the basis of own-company articles. For example, the category may be set on the basis of logistics of an own-company store. More specifically, the category may be set on the basis of ease of determining an assortment of products in the store or the like.

However, the category and the feature may be those set on the basis of other information such as a classification used for general commercial statistics or features often used in a networking service.

Furthermore, the category acquisition unit 120 may change at least one of the category and the feature on the basis of at least one of characteristics of a store that sells the article, a surrounding environment of the store, and a season.

The characteristics of the store may be related to at least one of a size of the store, the number of clerks at the store, a location of the store, a customer segment of the store, and opening hours of the store. For example, examples of characteristics related to the number of clerks at the store include an unmanned store, a labor-saving store, and a manned store.

The surrounding environment of the store may be at least one of a weather condition of an area that includes the store, a building adjacent to the store, a neighborhood housing state of the store, a land category of land where the store is located, and an event in the store's neighborhood.

The weather condition in the vicinity of the store is, for example, sunny, cloudy, rainy, or snowy. The building adjacent to the store is, for example, a type of building (event venue (exhibition hall, theater, or stadium), factory, or the like). The neighborhood housing state is, for example, a type of housing such as a state where there are many stand-alone houses or a state where there are many high-rise apartments. The land category is use of the land, and is a rice field, a field, a residential land, a pond, a mountain forest, a ranch, or the like. The event in the neighborhood is an event (concert, festival, sporting event such as a marathon, or the like) held in the vicinity of the store.

The own-company article acquisition unit 130 uses information stored in the article storage unit 230 to acquire an own-company article related to at least one of a category and a feature acquired by the category acquisition unit 120. The own-company article acquisition unit 130 may acquire a plurality of own-company articles, instead of acquiring only one article.

As an example, a case will be described where the own-company article acquisition unit 130 uses the information in FIG. 3. For example, it is assumed that the category acquisition unit 120 acquires white bread as a category. In this case, the own-company article acquisition unit 130 uses the information in FIG. 3 to acquire the bread A and the bread B as own-company articles.

The description returns to the description with reference to FIG. 1.

The display unit 140 displays an own-company article acquired by the own-company article acquisition unit 130. The display location where the display unit 140 displays the own-company article is not limited. The display unit 140 may include a device that displays an image, such as a liquid crystal display, and may display the own-company article on the device. Alternatively, the display unit 140 may display the own-company article by controlling a display device (not illustrated) to display the own-company article.

The other-company article acquisition unit 110 uses a predetermined index in the networking service to acquire an other-company article. Information related to an evaluation is related to a predetermined evaluation in the networking service. The other-company article acquisition unit 110 acquires an other-company article that has received a predetermined evaluation in a networking service.

The category acquisition unit 120 acquires at least one of a category and a feature related to the other-company article acquired by the other-company article acquisition unit 110. That is, the category acquisition unit 120 acquires at least one of a category and a feature related to an article that has received a predetermined evaluation in a networking service. As an example, a case where the information illustrated in FIG. 2 is used will be described. For example, in a case where the category acquisition unit 120 has received bread W as an other-company product, the category acquisition unit 120 acquires sweet buns as a category.

The own-company article acquisition unit 130 acquires an own-company article related to at least one of a category and a feature acquired by the category acquisition unit 120. That is, the own-company article acquisition unit 130 acquires an own-company article related to an article that has received a predetermined evaluation in a networking service. As an example, a case where the information illustrated in FIG. 3 is used will be described. For example, in a case where the own-company article acquisition unit 130 has received sweet buns as a category, the own-company article acquisition unit 130 acquires bread C and bread D as own-company articles.

The display unit 140 displays an own-company article acquired by the own-company article acquisition unit 130. That is, the display unit 140 displays an own-company article related to an article that has received a predetermined evaluation in a networking service. The article related to the article that has received the predetermined evaluation in the networking service is effective as an article to be included in an assortment of products in a store. That is, the own-company article displayed by the display unit 140 is an article recommended to be included in the assortment of products in the store.

The display unit 140 may indicate that a displayed own-company article is a recommended article. For example, the display unit 140 may overlay a word "recommended" on a displayed own-company article. Alternatively, the display unit 140 may change the display size, the display color, or the like of an own-company article displayed as a recommended article.

As described above, on the basis of the operation described above, the article recommendation device 100 can display, as a recommended article, an own-company article related to an article that has received a predetermined evaluation in a networking service.

At the time of ordering an article or the like, a user of the article recommendation device 100 may reference an own-company article displayed as a recommended article.

In particular, a labor-saving store is smaller in size than a normal store and has a limited sales area. Therefore, it is necessary to narrow down at least one of the types of articles to be sold and inventory quantities in the store in a labor-saving store as compared with a normal store.

The article recommendation device 100 can display an appropriate own-company article as a recommended article. This allows a user of the article recommendation device 100 to more appropriately narrow down the types of articles in an assortment of products in a labor-saving store.

The other-company article acquisition unit 110 may transmit, to another component, an evaluation value (e.g., the number of times a social button has been pressed) used to acquire an other-company article. In this case, for example, the display unit 140 may display the received evaluation value in association with an own-company article.

Alternatively, the display unit 140 may change the display of the own-company article by using the evaluation value associated with the own-company article. For example, the display unit 140 may display the own-company article larger as the evaluation value associated with the own-company article is larger.

For example, in a case where the own-company article acquisition unit 130 acquires a plurality of own-company articles and the display unit 140 displays the plurality of own-company articles, the display unit 140 can display appropriateness of each one of the plurality of own-company articles as a recommended article on the basis of the operation described above.

The format of information related to an article acquired by the other-company article acquisition unit 110 and the own-company article acquisition unit 130 is not limited. For example, the other-company article acquisition unit 110 and the own-company article acquisition unit 130 may acquire an article name or may acquire a code indicating the article. Furthermore, the other-company article acquisition unit 110 and the own-company article acquisition unit 130 may use different formats.

An installation location of the article recommendation device 100 is not limited. For example, the article recommendation device 100 may be included in a management system for managing a plurality of stores. Alternatively, the article recommendation device 100 may be included in a store management device for managing a store. Alternatively, the article recommendation device 100 may be included in a point of sale (POS) terminal.

Next, an operation in the first example embodiment will be described.

Figure 4:
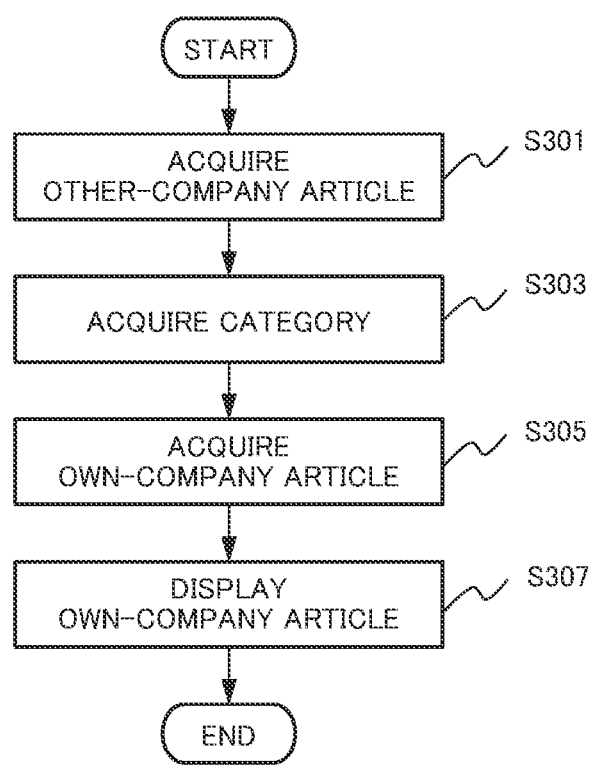
FIG. 4 is a flowchart illustrating an operation of the article recommendation device according to the first example embodiment.

FIG. 4 is a flowchart illustrating an operation of the article recommendation device 100 according to the first example embodiment.

The other-company article acquisition unit 110 in the article recommendation device 100 acquires an other-company article in a networking service by using an evaluation of the other-company article in the networking service and a predetermined index (step S301).

The category acquisition unit 120 acquires at least one of a category that includes the acquired other-company article and a feature of the other-company article (collectively referred to as a "category" in FIG. 4) (step S303).

The own-company article acquisition unit 130 acquires an own-company article related to at least one of the acquired category and the feature (step S305).

The display unit 140 displays the acquired own-company article as a recommended article (step S307).

Thus, the operation in the first example embodiment is completed.

Next, effects of the first example embodiment will be described.

The first example embodiment has an effect of recommending an article related to an article with a good reputation in a networking service.

This is because of the following reasons.

The article recommendation device 100 includes the other-company article acquisition unit 110, the category acquisition unit 120, the own-company article acquisition unit 130, and the display unit 140. The other-company article acquisition unit 110 acquires an other-company article (first article) on the basis of information related to a predetermined evaluation in a networking service. The category acquisition unit 120 acquires at least one of a category that includes the acquired other-company article and a feature of the other-company article. The own-company article acquisition unit 130 acquires an own-company article (second article) related to at least one of the acquired category and the feature. The display unit 140 displays the acquired own-company article as a recommended article.

On the basis of the operation described above, the article recommendation device 100 configured as described above can display, as a recommended article, an own-company article related to an article that has received a predetermined evaluation in a networking service.

Next, an outline of the first example embodiment will be described.

Figure 5:
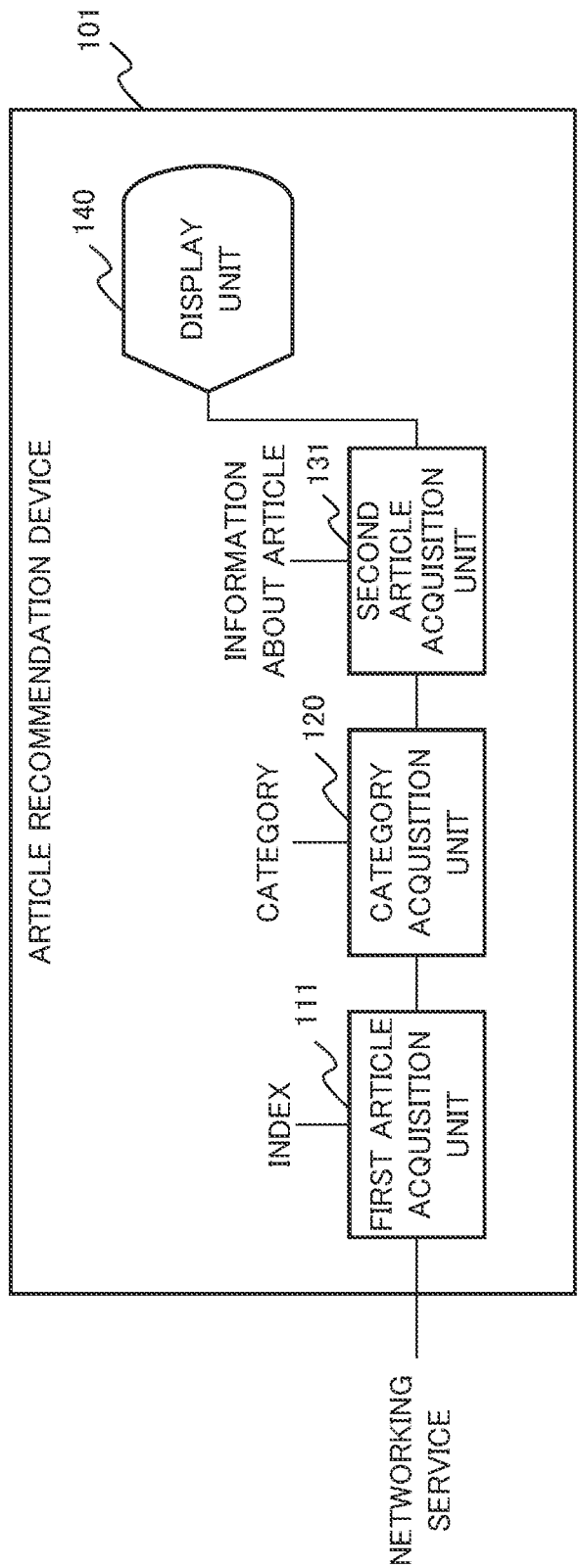
FIG. 5 is a block diagram illustrating a configuration of the article recommendation device, which is an outline of the first example embodiment.

FIG. 5 is a block diagram illustrating a configuration of an article recommendation device 101, which is the outline of the first example embodiment.

The article recommendation device 101 includes a first article acquisition unit 111, the category acquisition unit 120, a second article acquisition unit 131, and the display unit 140. The first article acquisition unit 111 acquires a first article on the basis of information related to a predetermined evaluation in a networking service. The category acquisition unit 120 acquires at least one of a category that includes the acquired first article and a feature of the first article. The second article acquisition unit 131 acquires a second article related to at least one of the acquired category and the feature. The display unit 140 displays the acquired second article as a recommended article.

More specifically, the first article acquisition unit 111 acquires a first article in a networking service by using an index for evaluation in a device or a component corresponding to the index storage unit 210. The category acquisition unit 120 acquires at least one of a category that includes the first article and a feature of the first article by using a category or a feature in a device or a component corresponding to the category storage unit 220. The second article acquisition unit 131 acquires a second article related to the acquired category or the feature by using information related to an article in a device or a component corresponding to the article storage unit 230. Then, the display unit 140 displays the acquired second article as a recommended article.

An example of the first article is an other-company article. An example of the first article acquisition unit 111 is the other-company article acquisition unit 110. An example of the second article is an own-company article. An example of the second article acquisition unit 131 is the own-company article acquisition unit 130. However, the outline of the first example embodiment is not limited to the above.

The article recommendation device 101 configured as described above can obtain effects similar to those of the article recommendation device 100.

This is because each component of the article recommendation device 101 operates in a similar manner to the similar component in the article recommendation device 100.

The article recommendation device 101 has a minimum configuration in the first example embodiment.

Second Example Embodiment

A second example embodiment will be described.

An own-company article displayed by an article recommendation device 100 is an appropriate article to be included in an assortment of products in a store. However, an inventory quantity at each store may be different from an appropriate inventory quantity. For this reason, as the second example embodiment, an article recommendation device 102 for managing delivery of an article so that an inventory quantity in a store is optimized will be described.

A configuration of the article recommendation device 102 according to the second example embodiment will be described.

Figure 6:
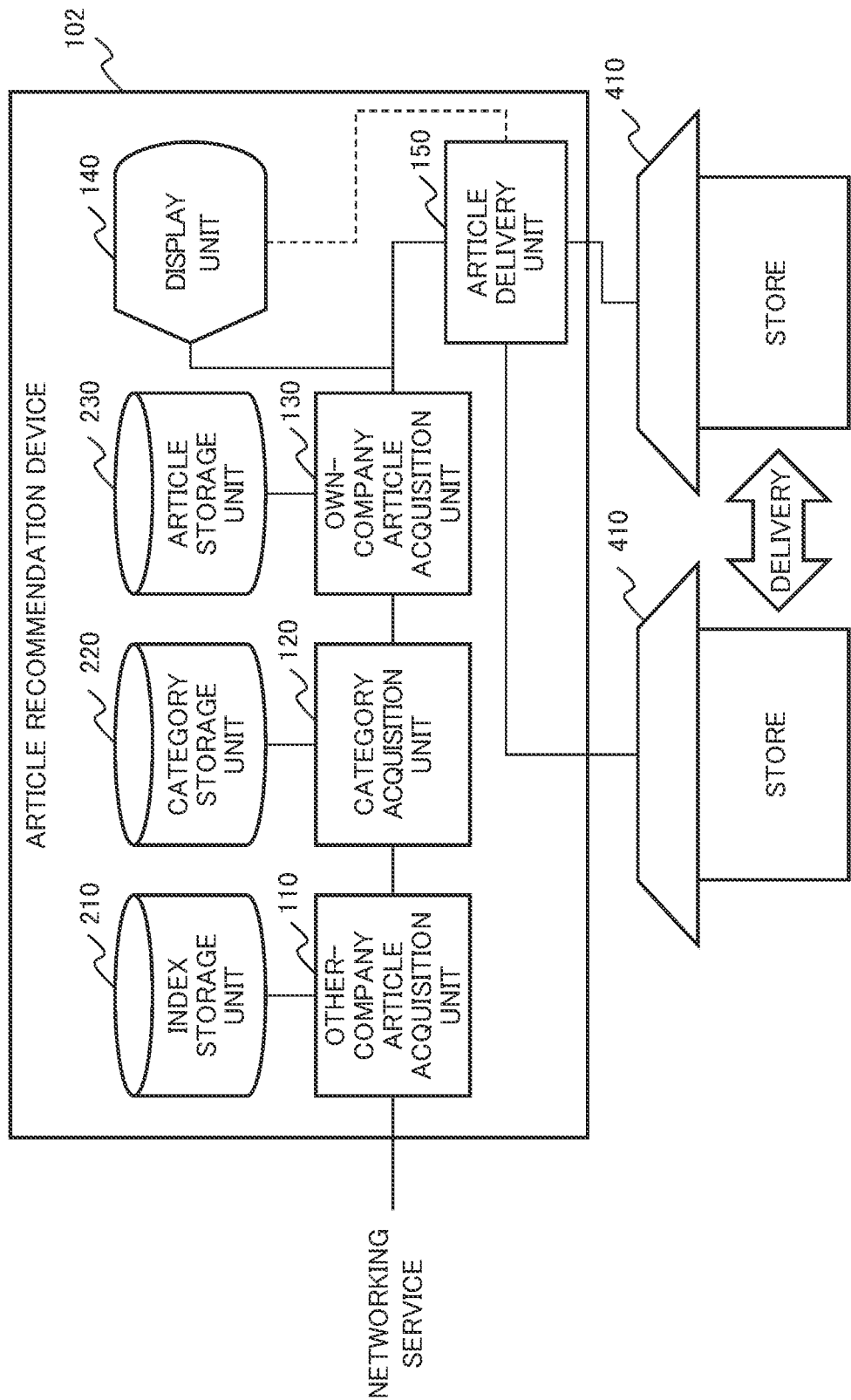
FIG. 6 is a block diagram illustrating a configuration of an article recommendation device according to a second example embodiment.

FIG. 6 is a block diagram illustrating the configuration of the article recommendation device 102 according to the second example embodiment.

Referring to FIG. 6, the article recommendation device 102 includes an article delivery unit 150 in addition to the components of the article recommendation device 100. Since the components other than the article delivery unit 150 are similar to those in the first example embodiment, description related to those components is omitted.

The article delivery unit 150 acquires an own-company article, which is a recommended article, from an own-company article acquisition unit 130. Furthermore, the article delivery unit 150 acquires an inventory quantity of the own-company article in each store 410. Then, in accordance with the inventory quantities, the article delivery unit 150 determines a quantity of the own-company article to be delivered from one store 410 to another store 410 (delivery quantity) so that the inventory quantities in the stores 410 are optimized. The article delivery unit 150 may determine delivery quantities among equal to or more than three stores 410.

The article delivery unit 150 may acquire the inventory quantity of the own-company article in each store from a device that manages an article inventory via a predetermined communication line. For example, in a case where each store is provided with an article management server, the article delivery unit 150 may acquire the inventory quantity from the article management server of the store. Alternatively, in a case where articles in all the stores are centrally managed, the article delivery unit 150 may acquire the inventory quantities from a management device that centrally manages the articles.

The method by which the article delivery unit 150 determines a delivery quantity is not limited. The article delivery unit 150 may determine a delivery quantity by using a predetermined prediction method (e.g., a statistical method such as a Kalman filter, a method using artificial intelligence such as deep learning, or the like).

The article delivery unit 150 outputs the determined delivery quantity to a predetermined output destination.

For example, the article delivery unit 150 may display the determined delivery quantity on a display unit 140. For this reason, FIG. 6 illustrates a relationship between the article delivery unit 150 and the display unit 140 by using a dotted line.

Furthermore, the article delivery unit 150 may change a delivery quantity on the basis of at least one of characteristics of a store 410 and a surrounding environment of the store 410. Here, the characteristics of the store 410 and the surrounding environment of the store 410 are similar to the characteristics and the surrounding environment described in the first example embodiment. For example, the article delivery unit 150 may change the delivery quantity on the basis of whether a delivery destination is a manned store or a labor-saving store.

A user of the article recommendation device 102 may deliver an own-company article between the stores 410 in accordance with the delivery quantity determined by the article delivery unit 150.

The article delivery unit 150 may automatically notify a store clerk or a delivery company for an own-company article of the delivery quantity of the own-company article and request a delivery of the own-company article.

Next, an operation in the second example embodiment will be described.

Figure 7:
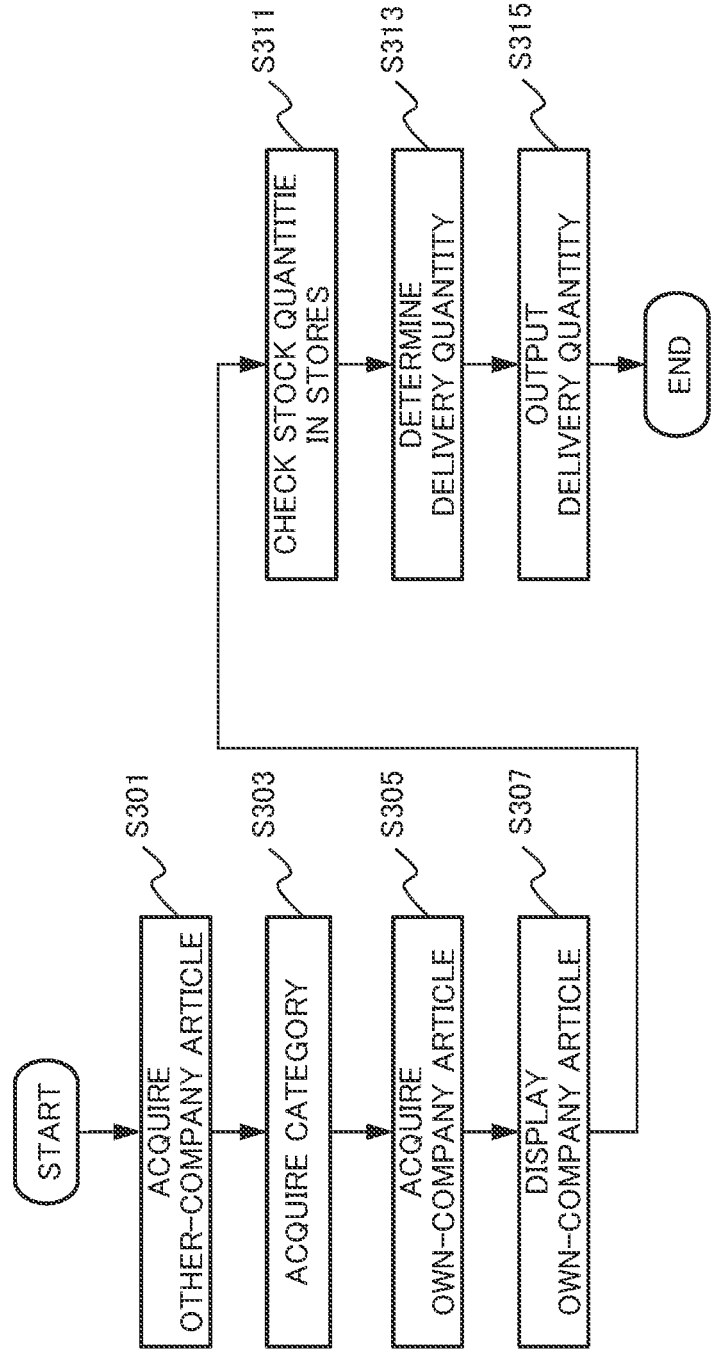
FIG. 7 is a flowchart illustrating an operation of the article recommendation device according to the second example embodiment.

FIG. 7 is a flowchart illustrating an operation of the article recommendation device 102 according to the second example embodiment.

An other-company article acquisition unit 110 in the article recommendation device 102 acquires an other-company article in a networking service by using an evaluation of the other-company article in the networking service and a predetermined index (step S301).

A category acquisition unit 120 acquires at least one of a category that includes the acquired other-company article and a feature of the other-company article (collectively referred to as a "category" in FIG. 7) (step S303).

The own-company article acquisition unit 130 acquires an own-company article related to at least one of the acquired category and the feature (step S305).

The display unit 140 displays the acquired own-company article as a recommended article (step S307).

The article delivery unit 150 checks the inventory quantities of the own-company article in the stores 410 (step S311).

In accordance with the inventory quantities, the article delivery unit 150 determines the quantity of the own-company article to be delivered from one store 410 to another store 410 (delivery quantity) so as to optimize the inventory quantities in the stores 410 (step S313).

The article delivery unit 150 outputs the determined delivery quantity (step S315). For example, the article delivery unit 150 may display the determined delivery quantity on the display unit 140. Alternatively, the article delivery unit 150 may automatically notify a store clerk or a delivery company for the own-company article of the delivery quantity of the own-company article and request a delivery of the own-company article.

Thus, the operation in the second example embodiment is completed.

Next, effects of the second example embodiment will be described.

In addition to the effects of the first example embodiment, the second example embodiment has an effect of optimizing inventory quantities of an own-company article in the stores 410.

The reason is that the article delivery unit 150 determines a delivery quantity of the own-company article so that the inventory quantities of the own-company article in the stores 410 are optimized.

Third Example Embodiment

A third example embodiment will be described.

An own-company article displayed by an article recommendation device 100 is an appropriate article to be included in an assortment of products in a store 410. However, in a case where the own-company article cannot be delivered, or in a case where the inventory quantity of the own-company article is insufficient even if the own-company article is delivered, it is necessary to order the own-company article. For this reason, as the third example embodiment, an article recommendation device 103 for ordering an own-company article will be described.

A configuration of the article recommendation device 103 according to the third example embodiment will be described.

Figure 8:
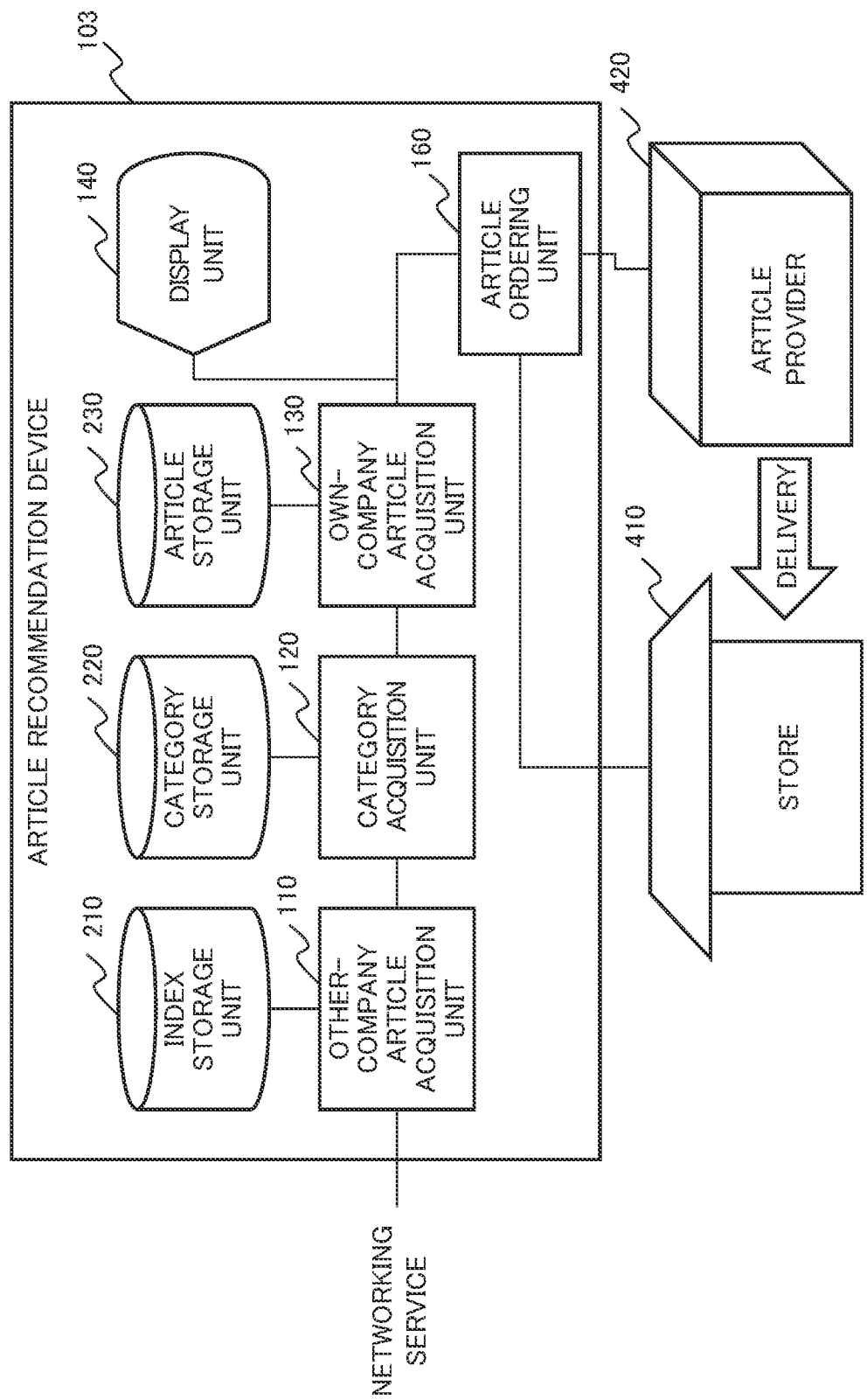
FIG. 8 is a block diagram illustrating a configuration of an article recommendation device according to a third example embodiment.

FIG. 8 is a block diagram illustrating the configuration of the article recommendation device 103 according to the third example embodiment.

Referring to FIG. 8, the article recommendation device 103 includes an article ordering unit 160 in addition to the components of the article recommendation device 100. Since the components other than the article ordering unit 160 are similar to those in the first example embodiment, description related to those components is omitted.

The article ordering unit 160 checks an inventory quantity in the store 410, and orders a required quantity of an own-company article from a provider of the own-company article. The method of calculating the required quantity is not limited. For example, the required quantity is calculated by applying the inventory quantity to a predetermined prediction method (e.g., a statistical method such as a Kalman filter, a method using artificial intelligence such as deep learning, or the like).

The article ordering unit 160 may acquire the inventory quantity in a similar manner to the article delivery unit 150 in the second example embodiment.

The article ordering unit 160 may have a function of automatically placing an order (automatic ordering function) that does not require an operation by a store clerk or the like, or may be configured to place an order on the basis of an instruction from a store clerk or the like.

An article provider 420 is not limited. For example, the article provider 420 is a warehouse where the own-company article is stored, or a manufacturer that creates the own-company article.

The article recommendation device 103 may include a component corresponding to the article delivery unit 150 in the second example embodiment. In this case, the article ordering unit 160 may determine the required quantity of the own-company article with reference to a delivery quantity determined by the article delivery unit 150.

Next, an operation in the third example embodiment will be described.

Figure 9:
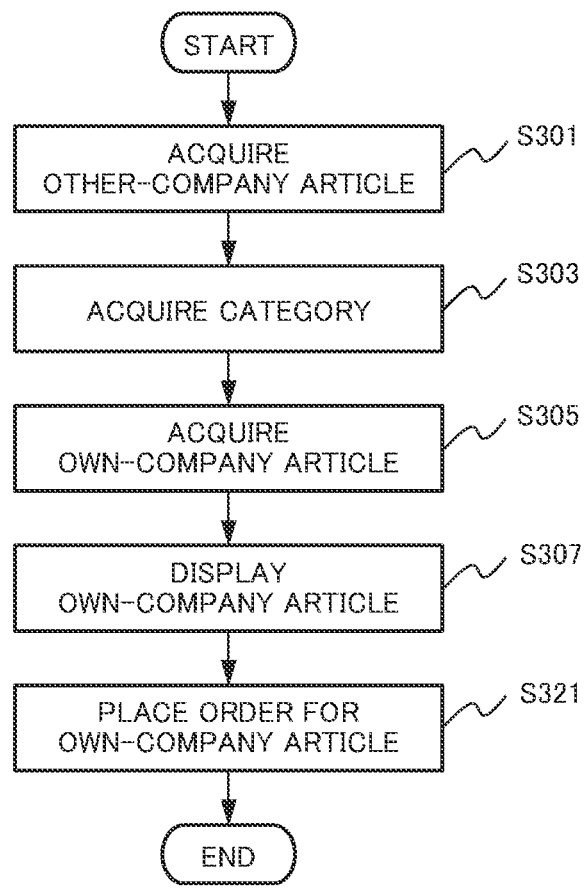
FIG. 9 is a flowchart illustrating an operation of the article recommendation device according to the third example embodiment.

FIG. 9 is a flowchart illustrating an operation of the article recommendation device 103 according to the third example embodiment.

An other-company article acquisition unit 110 in the article recommendation device 103 acquires an other-company article in a networking service by using an evaluation of the other-company article in the networking service and a predetermined index (step S301).

A category acquisition unit 120 acquires at least one of a category that includes the acquired other-company article and a feature of the other-company article (collectively referred to as a "category" in FIG. 9) (step S303).

An own-company article acquisition unit 130 acquires an own-company article related to at least one of the acquired category and the feature (step S305).

A display unit 140 displays the acquired own-company article as a recommended article (step S307).

The article ordering unit 160 orders the acquired own-company article from a predetermined order destination (step S321).

Thus, the operation in the third example embodiment is completed.

The order destination delivers the ordered own-company article to the store 410.

Next, effects of the third example embodiment will be described.

In addition to the effects of the first example embodiment, the third example embodiment has an effect of placing an order for a necessary own-company article.

The reason is that the article ordering unit 160 orders the own-company article in accordance with the inventory quantity.

For example, in a case where the article ordering unit 160 has an automatic ordering function, in the third example embodiment, it is possible to order an own-company article related to an article that has received a predetermined evaluation in a networking service so that an appropriate inventory quantity is secured. Thus, the third example embodiment reduces an opportunity loss of an own-company article.

(Hardware Configuration)

In each of the example embodiments described above, the components of each of the devices (article recommendation devices 100 to 103) represent blocks of functional units. Some or all of the components of each device may be constituted by any combination of a computer and a program.

Figure 10:
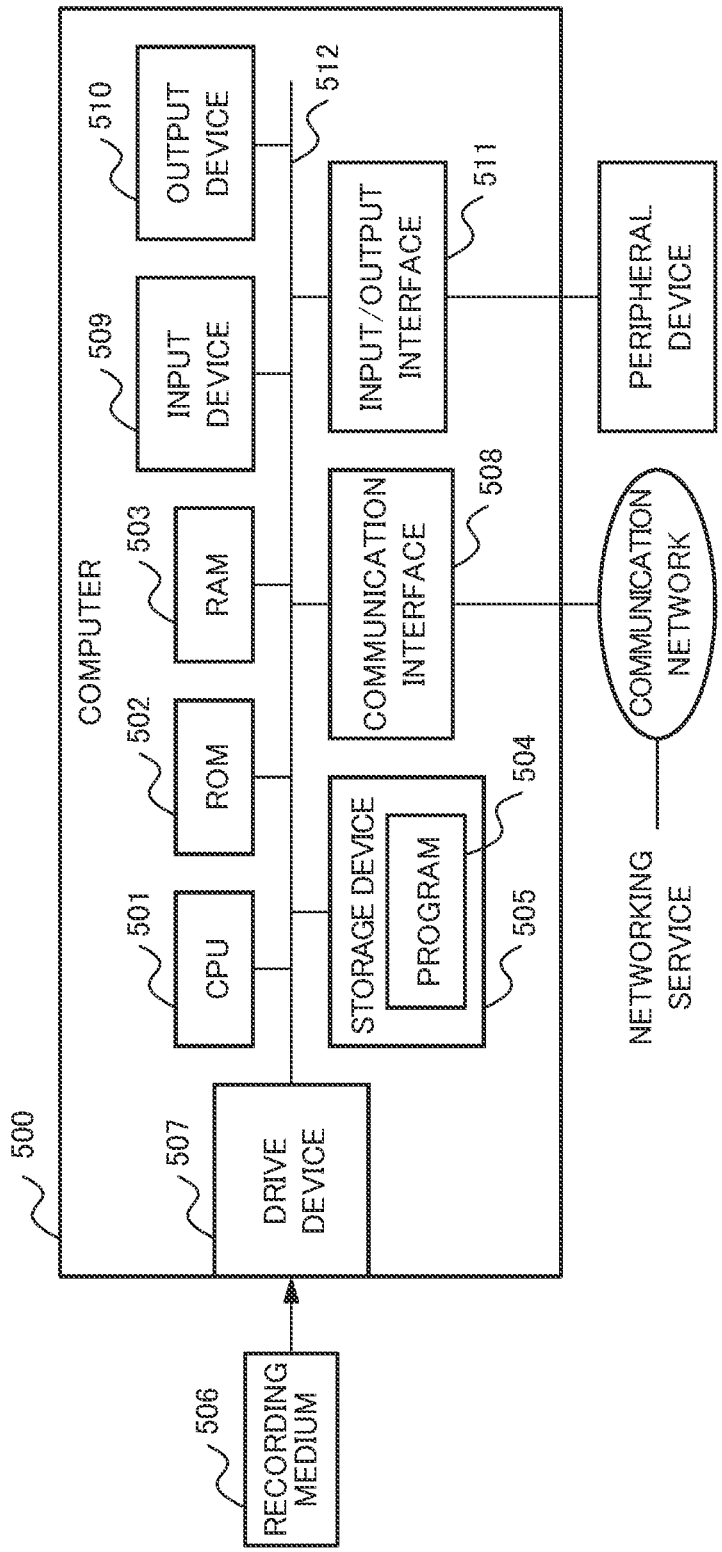
FIG. 10 is a block diagram illustrating an example of a hardware configuration of a computer that constitutes a device according to each example embodiment.

FIG. 10 is a block diagram illustrating an example of a hardware configuration of a computer 500.

Referring to FIG. 10, the computer 500 includes a central processing unit (CPU) 501, which is an example of a processor. The computer 500 further includes a read only memory (ROM) 502 and a random access memory (RAM) 503, which are examples of memories. The computer 500 further includes a program 504, a storage device 505, a drive device 507, a communication interface 508, an input device 509, an output device 510, an input/output interface 511, and a bus 512.

The program 504 includes an instruction for implementing each function of each device. The program 504 is stored in advance in at least one of the ROM 502, the RAM 503, and the storage device 505.

The CPU 501 implements each function of each device by executing an instruction included in the program 504. For example, the CPU 501 of the article recommendation device 100 executes an instruction included in the program 504 to cause the computer 500 to implement functions as the other-company article acquisition unit 110, the category acquisition unit 120, the own-company article acquisition unit 130, and the display unit 140.

In addition to the program 504, the ROM 502 stores data required to be stored in advance in each function of each device, such as an initial value.

In addition to the program 504, the RAM 503 stores data to be temporarily stored in each function of each device. For example, the RAM 503 of the article recommendation device 100 may store an acquired own-company article.

In addition to the program 504, the storage device 505 stores a large amount of data that cannot be stored in the ROM 502 and the RAM 503. Furthermore, the storage device 505 stores data to be stored for a long period of time or data that is less frequently changed. For example, the storage device 505 of the article recommendation device 100 may operate as an index storage unit 210, a category storage unit 220, and an article storage unit 230.

A recording medium 506 records data to be used by the computer 500. The recording medium 506 may record data acquired by the computer 500.

The drive device 507 reads data recorded on the recording medium 506. Furthermore, the drive device 507 may write data to the recording medium 506.

The recording medium 506 may further include at least a part of the program 504. In this case, the program 504 recorded on the recording medium 506 may be read by the drive device 507, stored in the RAM 503 or the storage device 505, and supplied to the CPU 501.

The ROM 502, the storage device 505, and the recording medium 506 are examples of non-volatile (non-transitory) recording media.

The communication interface 508 provides an interface with a communication network. For example, the communication interface 508 of the article recommendation device 100 may operate as a part of the other-company article acquisition unit 110. Alternatively, for example, the communication interface 508 of the article recommendation device 102 may operate as a part of the article delivery unit 150. Alternatively, for example, the communication interface 508 of the article recommendation device 103 may operate as a part of the article ordering unit 160.

The program 504 may be supplied to the computer 500 from a device (not illustrated) connected to the communication network via the communication interface 508.

The input device 509 is, for example, a mouse and a keyboard, and receives an input of information from an administrator or the like of the computer 500. For example, the input device 509 may operate as a device through which the article ordering unit 160 receives a user's instruction in the article recommendation device 103.

The output device 510 is, for example, a display, and outputs (displays) information to an administrator or the like. For example, the output device 510 may operate as the display unit 140 in the article recommendation device 100.

The input/output interface 511 provides an interface with a peripheral device. For example, in a case where the display unit 140 of the article recommendation device 100 controls an external display device, the input/output interface 511 may operate as a part of the display unit 140.

The bus 512 connects the components of the hardware described above.

The hardware configuration illustrated in FIG. 10 is an example. The computer 500 may include components other than the components described above, or may not include some of the components described above.

Modifications

As to how each device is implemented, various modifications are available. For example, components of each device may be constituted by any combination of different computers and programs.

Alternatively, a plurality of components included in each device may be constituted by any combination of one computer and a program.

Alternatively, some or all of the components of each device may be constituted by a universal circuit (circuitry) or a dedicated circuit including a processor or the like, or a combination thereof.

The circuit described above may be constituted by a single chip, or may be constituted by a plurality of chips connected via a bus.

Some or all of the components of each device may be implemented by a combination of the above-described circuit or the like and a program.

In a case where some or all of the components of each device are implemented by a plurality of computers, circuits, and the like, the plurality of computers, circuits, and the like may be arranged in a centralized manner, or may be arranged in a distributed manner.

Each device of each example embodiment may be arranged in a store, or may be arranged in a place other than a store and connected to a device (e.g., a POS terminal or a store server) in the store via a communication network. That is, each device may be implemented by a cloud computing system.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present invention. In addition, the configurations in the example embodiments can be combined with each other without departing from the scope of the present disclosure.

Some or all of the above example embodiments may be described as the following Supplementary Notes, but are not limited to the following.

(Supplementary Note 1)
An article recommendation device including:
a memory; and
at least one processor coupled to the memory,
the processor performing operations, the operations including:
acquiring a first article based on information related to a predetermined evaluation in a networking service;
acquiring at least one of a category that includes the acquired first article and a feature of the first article;
acquiring a second article related to at least one of the acquired category and the feature; and
displaying the acquired second article as a recommended article.

(Supplementary Note 2)
The article recommendation device according to Supplementary Note 1, in which
the feature of the first article relates to at least one of a shape, a size, a weight, a color, a tactile sensation, a taste, a raw material, a packaging, and a price of the first article.

(Supplementary Note 3)
The article recommendation device according to Supplementary Note 1 or 2, in which
the information related to the evaluation is information related to an evaluation by at least one of a predetermined person using the networking service and a predetermined group using the network service.

(Supplementary Note 4)
The article recommendation device according to any one of Supplementary Notes 1 to 3, in which
the information related to the evaluation is an image shared on the networking service.

(Supplementary Note 5)
The article recommendation device according to any one of Supplementary Notes 1 to 4, in which the operations further include
changing at least one of the category and the feature based on at least one of characteristics of a store that sells the second article, a surrounding environment of the store, and a season.

(Supplementary Note 6)
The article recommendation device according to Supplementary Note 5, in which
the characteristics of the store relate to at least one of a size of the store, the number of clerks at the store, a location of the store, a customer segment of the store, and opening hours of the store.

(Supplementary Note 7)
The article recommendation device according to Supplementary Note 5 or 6, in which
the surrounding environment of the store includes at least one of a weather condition of an area that includes the store, a building adjacent to the store, a neighborhood housing state of the store, a land category of land where the store is located, and an event in the store's neighborhood.

(Supplementary Note 8)
The article recommendation device according to any one of Supplementary Notes 1 to 7, in which the operations further include:
determining a quantity of the second article to be delivered from one store to another store in accordance with an inventory quantity of the second article in each one of a plurality of the stores.

(Supplementary Note 9)
The article recommendation device according to any one of Supplementary Notes 1 to 8, in which the operations further include:
ordering the second article.

(Supplementary Note 10)
An article recommendation method including:
acquiring a first article based on information related to a predetermined evaluation in a networking service;
acquiring at least one of a category that includes the acquired first article and a feature of the first article;

acquiring a second article related to at least one of the acquired category and the feature; and displaying the acquired second article as a recommended article.

(Supplementary Note 11)

A non-transitory computer-readable recording medium that embodies a program that program. The program causes a computer to perform a method. The method includes:

acquiring a first article based on information related to a predetermined evaluation in a networking service;

acquiring at least one of a category that includes the acquired first article and a feature of the first article;

acquiring a second article related to at least one of the acquired category and the feature; and displaying the acquired second article as a recommended article.

This application is based upon and claims the benefit of priority from Japanese patent application No. 2019-053718, filed on Mar. 20, 2019, the disclosure of which is incorporated herein in its entirety by reference.

REFERENCE SIGNS LIST 100 article recommendation device
101 article recommendation device
102 article recommendation device
103 article recommendation device
110 other-company article acquisition unit
111 first article acquisition unit
120 category acquisition unit
130 own-company article acquisition unit
131 second article acquisition unit
140 display unit
150 article delivery unit
160 article ordering unit
210 index storage unit
220 category storage unit
230 article storage unit
410 store
420 article provider
500 computer
501 CPU
502 ROM
503 RAM
504 program
505 storage device
506 recording medium
507 drive device
508 communication interface
509 input device
510 output device
511 input/output interface
512 bus

What is claimed is:

1. An article recommendation device of a company, comprising:
at least one processor; and
a memory storing program code executable by the at least one processor to perform operations comprising:
storing a plurality of threshold values as an index;
acquiring a first article of a different company based on evaluations of a plurality of numbers in relation to the plurality of threshold values indicating that each number is greater than a corresponding threshold value, wherein the plurality of numbers comprises at least one of:
a first number of descriptions on a social networking service that include a name of the first article, wherein the descriptions are posts on the social networking service;
a second number of the descriptions on the social networking service that include the name of the first article and that include favorable comments regarding the article;
a third number of times that a social button was pressed for the descriptions on the social networking service that include the name of the first article;
a fourth number of times that a specific term or keyword was used in the descriptions on the social networking service that include the name of the first article;
a fifth number of times that the descriptions on the social networking service that include the name of the first article were made by particular persons;
a sixth number of times that each of a number of phrases were included in the descriptions on the social networking service that include the name of the first article, and assign a corresponding weight to the sixth number for each phrase;
a seventh number of times that the descriptions on the social networking service that include the name of the first article were made by a particular group;
upon acquiring the first article, retrieving, from a storage device, at least one of a category that includes the acquired first article and a feature of the first article;
identifying a second article of the company and that is related to the at least one of the category and the feature that have been acquired; and
displaying the second article that has been acquired, as a recommended article on a display device of the company, wherein
the feature of the first article includes at least one of a shape, a size, a weight, a color, a tactile sensation, a taste, a raw material, and a packaging of the first article.

2. The article recommendation device according to claim 1, wherein
the plurality of numbers further comprise an eighth number of a number of images including the first article shared on the networking service.

3. The article recommendation device according to claim 1, wherein the operations further comprise
changing at least one of the category and the feature based on at least one of characteristics of a store that sells the second article, a surrounding environment of the store, and a season.

4. The article recommendation device according to claim 3, wherein
the characteristics of the store relate to at least one of a size of the store, a number of clerks at the store, a location of the store, a customer segment of the store, and opening hours of the store.

5. The article recommendation device according to claim 3, wherein
the surrounding environment of the store includes at least one of a weather condition of an area that includes the store, a building adjacent to the store, a neighborhood housing state of the store, a land category of land where the store is located, and an event in a neighbor of the store.

6. The article recommendation device according to claim 1, wherein the operations further comprise:

determining a quantity of the second article to be delivered from a first store of a plurality of stores to a second store of the plurality of stores in accordance with an inventory quantity of the second article in each of the plurality of stores.

7. The article recommendation device according to claim 1, wherein the operations further comprise:
ordering the second article.

8. An article recommendation method comprising:
storing, by a processor, a plurality of threshold values as an index;
acquiring, by the processor, a first article of a different company based on evaluations of a plurality of numbers in relation to the plurality of threshold values indicating that each number is greater than a corresponding threshold value, wherein the plurality of numbers comprises at least one of:
  a first number of descriptions on a social networking service that include a name of the first article, wherein the descriptions are posts on the social networking service;
  a second number of the descriptions on the social networking service that include the name of the first article and that include favorable comments regarding the article;
  a third number of times that a social button was pressed for the descriptions on the social networking service that include the name of the first article;
  a fourth number of times that a specific term or keyword was used in the descriptions on the social networking service that include the name of the first article;
  a fifth number of times that the descriptions on the social networking service that include the name of the first article were made by particular persons;
  a sixth number of times that each of a number of phrases were included in the descriptions on the social networking service that include the name of the first article, and assign a corresponding weight to the sixth number for each phrase;
  a seventh number of times that the descriptions on the social networking service that include the name of the first article were made by a particular group;
upon acquiring the first article, retrieving, by the processor and from a storage device, at least one of a category that includes the acquired first article and a feature of the first article;
identifying, by the processor, a second article of the company and that is related to the at least one of the category and the feature that have been acquired; and
displaying, by the processor, the second article that has been acquired, as a recommended article on a display device of the company, wherein
the feature of the first article includes at least one of a shape, a size, a weight, a color, a tactile sensation, a taste, a raw material, and a packaging of the first article.

9. A non-transitory computer-readable recording medium storing a program executable by a computer to perform a method, the method comprising:
storing a plurality of threshold values as an index;
acquiring a first article of a different company based on evaluations of a plurality of numbers in relation to the plurality of threshold values indicating that each number is greater than a corresponding threshold value, wherein the plurality of numbers comprises at least one of:
  a first number of descriptions on a social networking service that include a name of the first article, wherein the descriptions are posts on the social networking service;
  a second number of the descriptions on the social networking service that include the name of the first article and that include favorable comments regarding the article;
  a third number of times that a social button was pressed for the descriptions on the social networking service that include the name of the first article;
  a fourth number of times that a specific term or keyword was used in the descriptions on the social networking service that include the name of the first article;
  a fifth number of times that the descriptions on the social networking service that include the name of the first article were made by particular persons;
  a sixth number of times that each of a number of phrases were included in the descriptions on the social networking service that include the name of the first article, and assign a corresponding weight to the sixth number for each phrase;
  a seventh number of times that the descriptions on the social networking service that include the name of the first article were made by a particular group;
upon acquiring the first article, retrieving, from a storage device, at least one of a category that includes the acquired first article and a feature of the first article;
identifying a second article of the company and that is related to the at least one of the category and the feature that have been acquired; and
displaying the second article that has been acquired, as a recommended article on a display device of the company, wherein
the feature of the first article includes at least one of a shape, a size, a weight, a color, a tactile sensation, a taste, a raw material, and a packaging of the first article.

10. The device of claim 1, wherein the plurality of numbers comprises at least the first number.

11. The device of claim 10, wherein the plurality of numbers further comprises at least the second number.

12. The device of claim 11, wherein the plurality of numbers further comprises at least the third number.

13. The device of claim 12, wherein the plurality of numbers further comprises at least the fourth number.

14. The device of claim 13, wherein the plurality of numbers further comprises at least the fifth number.

15. The device of claim 14, wherein the plurality of numbers further comprises at least the sixth number.

16. The device of claim 15, wherein the plurality of numbers further comprises at least the seventh number.

* * * * *